3,384,604
POLYMER PREPARATION

James Ping King, Cheltenham, Pa., assignor to Pennsalt Chemicals Corporation, Philadelphia, Pa., a corporation of Pennsylvania
No Drawing. Filed Aug. 13, 1965, Ser. No. 479,631
8 Claims. (Cl. 260—2)

This invention relates to an improved method for the preparation of certain inorganic polymers and is particularly concerned with the use of a chromium phosphinate complex as an intermediate to the preparation of polymers having the repeating unit

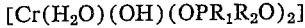

$$[Cr(H_2O)(OH)(OPR_1R_2O)_2]$$

where $R_1$ and $R_2$ are the same or different organic groups such as alkyl, aryl, alkoxy, and aryloxy radicals.

Polymers as described above may be prepared according to the method described by Saraceno and Block in Inorganic Chemistry 3, 1699 (1964). In that process chromous diacetate hydrate is reacted with the appropriate phosphinic acid to obtain chromous phosphinate and that product is oxidized in the presence of water to give the polymer. It has now been found that an improved process for the preparation of those polymers is achieved by first preparing an adduct of the chromous phosphinate and subsequently oxidizing the adduct in the presence of water to form the inorganic polymer. The inorganic polymer thus prepared has a very high molecular weight, as indicated by intrinsic viscosity values.

Thus, in accord with the present invention a chromous compound having the formula $Cr(OPR_1R_2O)_2 \cdot X$ is oxidized in the presence of water whereby the corresponding inorganic polymer is formed. $R_1$ and $R_2$ in the above formula are alkyl, aryl, alkoxy or aryloxy groups and are preferably a hydrocarbon alkyl or aryl group containing from 1 to 10 carbon atoms (e.g. methyl, ethyl, tertiary-butyl, hexyl, octyl, phenyl, tolyl, naphthyl, xylyl and the like groups). X in the above formula is a coordinating molecule and is selected from the group consisting of aliphatic alcohols (e.g. methanol, ethanol, isopropanol and isobutanol), and five and six membered heterocyclic compounds containing oxygen or sulfur as a coordinating atom (e.g. tetrahydrofuran, furan, thiophene, tetrahydrothiophene, dioxane, morpholine and the like). Preferably X will be selected from the group of lower aliphatic alcohols and heterocyclic compounds containing a five membered ring and the most preferred coordinating molecule for use in this invention will be tetrahydrofuran.

The method of making the chromium phosphate complexes is disclosed in copending application of James P. King and Burton P. Black, Ser. No. 479,621, filed Aug. 13, 1965 and involves the dissolving of a hydrate of chromium diacetate in the organic coordinating liquid (e.g. tetrahydrofuran). It is frequently desirable to heat the liquid solvent in order to ensure solution of the metal salt after the solution is prepared it is treated with a dehydrating agent such as magnesium sulfate to remove any water of hydration which is present in the metal salt and permit substitution of the neutral coordinating molecule for the water of hydration. Then the appropriate phosphinic acid is added to the solution and the chromous phosphate adduct precipitates either at room temperature or with cooling. The complex may then be filtered off, purified by washing, and dried. All of these steps should be carried out in an inert atmosphere (e.g. under nitrogen) to avoid premature oxidation.

In carrying out the process of the invention the complex may be suspended or dissolved in a liquid system comprising water and a solvent preferably using a solvent which corresponds to X. Thus, where a tetrahydrofuran complex is oxidized the complex will be suspended in tetrahydrofuran containing some water, and oxidation is best accomplished simply by allowing a stream of air to be bubbled into the suspension. Oxidation is judged complete when a clear, green solution is obtained and the solution is then filtered to remove any insoluble material and the solvent removed either by evaporation in air at room temperature or under vacuum. It will be understood, however, that oxidation may be carried out in any convenient liquid system containing water and even in water alone. The oxidation step, although essential to convert the phosphate complex to the polymer may employ any of the oxidants and techniques disclosed in Ser. No. 382,924, filed July 15, 1964 in the name of Anthony J. Saraceno, now U.S. Patent No. 3,275,574 granted Sept. 27, 1966, which discloses and claims the products obtained by the method of this invention.

Example 1

Chromium diacetate monohydrate (0.080 mole, 15.04 grams) was dissolved in 350 milliliters of tetrahydrofuran by refluxing until a clear, purple solution was obtained. About 10 grams of anhydrous magnesium sulfate was added to the solution and the mixture was stirred for an hour and filtered. Then a suspension of 23.7 grams (0.12 mole) of methylphenylphosphinic acid suspended in 50 milliliters of tetrahydrofuran was added to the filtrate and the reaction mixture gently stirred to give a clear blue solution. On standing, a light blue solid gradually deposited from the solution and after several hours the solid was separated by filtration. After washing the solid twice with 50 milliliter portions of tetrahydrofuran and removing the solvent by holding the solid vacuum at 1 millimeter mercury pressure for 1 hour, there was obtained 30.7 grams or a 94% yield of dry $Cr(OP(CH_3)(C_6H_5)O)_2 \cdot$ tetrahydrofuran. The blue colored product is soluble in benzene and toluene, has a crystalline X-ray diffraction pattern and its infrared spectrum is consistent with the formula given.

Analysis for the compound is as follows:

Calculated for $Cr[OP(CH_3)(C_6H_5)O]_2 \cdot C_4H_8O$: C, 49.80; H, 5.53; Cr, 11.9; P, 14.28. Found: C, 49.54; H, 5.22; Cr, 11.3; P, 14.58.

A 12.1 g. sample of $Cr[OP(CH_3)(C_6H_5)O]_2 \cdot C_4H_8O$ as prepared above was suspended in a solution made by adding 20 ml. of $H_2O$ to 220 ml. of tetrahydrofuran. A slow stream of air was bubbled into the mixture with stirring until a clear green solution was obtained. The solution was then filtered and allowed to evaporate in the air at room temperature. The residue was then pumped for a few hours at 40° to remove any remaining solvent. The product weighed 10.9 g. (99% yield) and had an intrinsic viscosity of 0.1 which increased to 0.78 after 48 days in chloroform (3% solution) at 55° C.

In a second run the initial intrinsic viscosity of 0.09 increased to 0.9 in 9 days. The infrared spectra are consitent with the formula $$[Cr(H_2O)(OH)(OP)(CH_3)(C_6H_5)O)_2]_n$$

*Analysis.*—Calcd. for $C_{14}H_{19}CrO_6P_2$: C, 42.33; H, 4.82; Cr, 13.1; P, 15.6. Found: C, 42.54 and 42.31; H, 4.89 and 5.13; Cr, 12.8 and 12.5; P, 15.68 and 15.62.

Example 2

Following the details and procedural steps of Example 1, 4.56 grams (0.0242 mole) of chromium diacetate monohydrate was treated with 9.70 grams (0.0480 mole) of diphenylphosphinic acid. The product $$Cr[OP(C_6H_5)_2O]_2 \cdot C_4H_8O$$

was blue and turned pink during drying under a stream of nitrogen.

A sample of the blue $Cr(OP(C_6H_5)_2O)_2 \cdot C_4H_8O$ was oxidized in the manner described in Example 1. The initial intrinsic viscosity of the product, 0.038, increased to 1.0 after 34 days in chloroform (3% solution) at 55° C.

*Analysis.*—Calcd. for $C_{24}H_{23}CrO_6P_2$: C, 55.29; H, 4.45; Cr, 9.97; P, 11.88. Found: C, 55.32; H, 3.97; Cr, 9.58; P, 11.60.

Another sample of blue $Cr[OP(C_6H_5)_2O]_2 \cdot C_4H_8O$ was converted to the pink product (presumably unsolvated) by pumping at 0.1 mm. of Hg with occasional heating. The pink solid was oxidized under identical conditions to a product with an initial intrinsic viscosity of 0.032 which increased to 0.7 in 34 days at 55° C. in 3% concentration in chloroform.

*Analysis.*—Found: C, 55.30; H, 4.02; Cr, 9.29; P, 11.89.

Example 3

Following the details of Example 1, 1.67 grams of chromium diacetate monohydrate was treated with 1.5 grams of dimethylphosphinic acid to yield $$Cr[OP(CH_3)_2O]_2 \cdot C_4H_8O$$

This blue product turned pink under high vacuum at room temperature. Exposure of the compound to air, either in the pink form or blue form, resulted in immediate oxidation to a green solid which analyzed for the inorganic polymer having the formula $$[Cr(H_2O)(OH)(OP(CH_3)_2O)_2]_n$$

which corresponds to the inorganic polymers described in Inorganic Chemistry 3, 1699 (1964).

Example 4

A sample of 3.3 g. (0.0174 mole) of $$Cr(OCOCH_3)_2H_2O$$

was dissolved in 150 ml. deaerated $CH_3OH$ by refluxing until a scarlet solution was obtained. Ten grams of anhydrous $MgSO_4$ was added to the solution and the mixture was stirred for an hour and filtered. A sample of 11.0 g. (0.0358 mole) of $(C_8H_{17})_2POOH$ was added to the filtrate and the reaction mixture was gently stirred to give a blue solution. A light blue solid was gradually deposited and was isolated under a nitrogen atmosphere by washing it twice with 50 ml. portions of $CH_3OH$ and drying it under 0.1 mm. Hg at room temperature for an hour. Its infrared spectrum is consistent with the formula $$Cr(OP(C_8H_{17})_2O)_2 \cdot CH_3OH$$

A sample of 2.0 g. of $Cr(OP(C_8H_{17})_2O)_2 \cdot CH_3OH$ was suspended in 30 ml. of a water-methanol mixture (5 to 25 by volume) and the mixture was exposed to air with vigorous agitation for several hours. A green solid was obtained which was recovered by filtration. The infrared spectrum of the product is consistent with the $$Cr(H_2O)(OH)(OP(C_8H_{17})_2O)_2$$

polymer.

Example 5

A 3.3 g. (0.0174 mole) sample of $Cr(OCOCH_3)_2 \cdot H_2O$ was dissolved in 150 ml. of deaerated $CH_3OH$ by refluxing until a clear solution was obtained. Ten grams of anhydrous $MgSO_4$ was added to the solution; the mixture was stirred for an hour and filtered. A suspension of 54 g. (0.0347 mole) of phenylmethylphosphinic acid in 25 ml. of $CH_3OH$ was added to the filtrate, and the reaction mixture was gently stirred to give a blue solution. A light blue solid was gradually deposited and was isolated under a nitrogen atmosphere and then washed twice with 30 ml. portions of $CH_3OH$. The product was dried under a vacuum of 0.1 mm. Hg pressure at room temperature for an hour. Its infrared spectrum is consistent with the formula $Cr(OP(CH_3)(C_6H_5)O)_2 \cdot CH_3OH$.

*Analysis.*—Calculated for $C_{15}H_{20}CrO_5P_2$: Cr, 13.2. Found: Cr, 13.0.

A sample of 1 g. of $Cr(OP(CH_3)(C_6H_5)O)_2 \cdot CH_3OH$ was suspended in 30 ml. of a water-$CH_3OH$ (5–25 by volume) solution. The mixture was exposed to air and stirred for several hours. A green solid was obtained and was isolated by filtration. Its infrared spectrum was identical with a sample of $$Cr(H_2O)(OH)(OP(CH_3)(C_6H_5)O)_2$$

polymer obtained by an alternate method.

Example 6

A mixture of 6.36 g. (0.0338 mole) of $$Cr(OCOCH_3)_2 \cdot H_2O$$

and 20 g. of $MgSO_4$ in 150 ml. of deaerated thiophene was refluxed for 30 min. under a slow stream of nitrogen and then a sample of 10.54 g. (0.0676 mole) of methylphenylphosphinic acid was introduced. The reaction mixture was refluxed for 45 min. and then filtered after cooling. The blue-violet filtrate was collected under a nitrogen atmosphere. Then 250 ml. of deaerated n-hexane was added to the filtrate to precipitate a gray-blue solid which was collected by filtration, washed several times with n-hexane and dried under vacuum of 0.1 mm. of Hg at room temperature. The infrared spectrum of the product is consistent with the proposed formulation $$Cr(OP(CH_3)(C_6H_5)O)_2 \cdot C_4H_4S$$

*Analysis.*—Calculated for $C_{18}H_{20}CrO_4P_2S$: C, 48.4; H, 4.50. Found: C, 48.1; H, 5.03.

A sample of 2 g. of $Cr(OP(CH_3)(C_6H_5)O)_2 \cdot C_4H_4S$ was suspended in 50 ml. of water-$CH_3OH$ (10–40 by volume) solution. The mixture was exposed to air and stirred for several hours. A green solid was obtained and isolated by filtration. Its infrared spectrum was identical with that of the polymer of Example 1.

I claim:

1. A process for preparing inorganic polymers which comprises oxidizing in the presence of water a compound of formula $Cr(OPR_1R_2O)_2 \cdot X$ where $R_1$ and $R_2$ are alkyl, aryl, alkoxy, or aryloxy and X is a coordinating molecule selected from the group consisting of aliphatic alcohols and five- and six-membered heterocyclic compounds containing oxygen or sulfur as a coordinating atom.

2. A process for preparing inorganic polymers which comprises oxidizing in the presence of water a chromous phosphinate of formula $Cr(OPR_1R_2O)_2 \cdot X$ where $R_1$ and $R_2$ are selected from the group consisting of hydrocarbon alkyl and aryl containing from 1 to 10 carbon atoms and X is a coordinating molecule selected from the group consisting of aliphatic alcohols containing from 1 to 4 carbon atoms and five- and six-membered heterocyclic compounds containing oxygen or sulfur as a coordinating atom.

3. A process as in claim 2 where a compound of the formula $Cr[OP(CH_3)(C_6H_5)O]_2 \cdot C_4H_8O$ is oxidized with air.

4. A process as in claim 2 where a chromous phosphinate of the formula $Cr[OP(C_6H_5)_2O]_2 \cdot C_4H_8O$ is oxidized with air.

5. A process as in claim 2 where a chromous phosphinate of the formula $Cr[OP(CH_3)_2O]_2 \cdot C_4H_8O$ is oxidized with air.

6. A process as in claim 2 where a chromous phosphinate of the formula $Cr[OP(C_8H_{17})_2O]_2 \cdot CH_3OH$ is oxidized with air.

7. A process as in claim 2 where a chromous phosphinate of the formula $$Cr[OP(CH_3)(C_6H_5)O]_2 \cdot CH_3OH$$

is oxidized with air.

8. A process as in claim 2 where a chromous phosphinate of the formula $$Cr[OP(CH_3)(C_6H_5)O]_2 \cdot C_4H_4S$$

is oxidized with air.

References Cited
UNITED STATES PATENTS 3,275,574  9/1966  Saraceno _____ 260—2

SAMUEL H. BLECH, *Primary Examiner.*